United States Patent

Omori et al.

Patent Number: 5,568,314
Date of Patent: Oct. 22, 1996

[54] IMAGE DISPLAY APPARATUS

[75] Inventors: Shigeru Omori, Nakai-machi; Tomohiko Hattori, Nagoyo; Jun Suzuki, Nakai-machi, Japan

[73] Assignee: Terumo Kabushiki Kaisha, Tokyo, Japan

[21] Appl. No.: 352,052

[22] Filed: Nov. 30, 1994

[30] Foreign Application Priority Data

Dec. 3, 1993 [JP] Japan .................................. 5-304380

[51] Int. Cl.⁶ ........................ G02B 27/22; H04N 13/04
[52] U.S. Cl. ...................... 359/464; 359/466; 359/462; 348/51
[58] Field of Search .................. 359/462, 466, 359/467, 468, 470, 472; 348/42, 51, 52

[56] References Cited

U.S. PATENT DOCUMENTS

| | | | |
|---|---|---|---|
| 4,385,316 | 5/1983 | Yanagisawa | 358/89 |
| 4,647,966 | 3/1987 | Phillips et al. | 358/88 |
| 4,649,425 | 3/1987 | Pund | 358/88 |
| 4,717,949 | 1/1988 | Eichenlaub | 358/3 |
| 4,829,365 | 5/1989 | Eichenlaub | 358/3 |
| 4,870,600 | 9/1989 | Hiraoka | 364/522 |
| 4,890,902 | 1/1990 | Doane et al. | 350/347 |
| 4,922,336 | 5/1990 | Morton | 358/88 |
| 5,008,658 | 4/1991 | Russay et al. | 340/784 |
| 5,059,957 | 10/1991 | Todoriki et al. | 340/705 |
| 5,132,839 | 7/1992 | Travis | 359/462 |
| 5,162,785 | 11/1992 | Fagard | 340/784 |
| 5,311,220 | 5/1994 | Eichenlaub | 348/55 |

FOREIGN PATENT DOCUMENTS

| | | |
|---|---|---|
| 0505998 | 9/1992 | European Pat. Off. . |
| 0576106 | 12/1993 | European Pat. Off. . |
| 0602934 | 6/1994 | European Pat. Off. . |
| 0601308 | 6/1994 | European Pat. Off. . |
| 63-127777 | 5/1988 | Japan . |
| 63-194497 | 8/1988 | Japan . |
| 5-22722 | 1/1993 | Japan . |
| 2111798 | 7/1983 | United Kingdom . |
| 2206763 | 1/1989 | United Kingdom . |
| WO83/02169 | 6/1983 | WIPO . |

OTHER PUBLICATIONS

"Automatic Viewing Range Tracing Method for Communication Equipment", K. Yamamoto et al., IEEE Transactions on Consumer Electronics, vol. 37, No.3, Aug. 1991, pp. 424–431.

J. R. Moore, A. R. L. Travis, S. R. Lang, O. M. Castle, "The Implementation of a Multi–view Autostereoscopic Display", Image Technology Journal of the B.K.S.T.S., Jan./Feb. 1993, No. 1, five pages.

Karen E. Jachimowicz, Ronald S. Gold, "Stereoscopic (3–D) projection display using polarized color multiplexing", Optical Engineering, Aug. 1990, vol. 29, No. 8, pp. 838–842.

Primary Examiner—Paul M. Dzierzynski
Assistant Examiner—Audrey Y. Chang
Attorney, Agent, or Firm—Burns, Doane, Swecker & Mathis, LLP

[57] ABSTRACT

A space modulation device 10 displays an image for right eye and an image for left eye. An observer image display device 12 displays an image of a half surface of an observer's face obtained by an imaging device 14 and a negative-positive reversed image of the image of the half surface of the face. A lens 11 allows the image for right eye or the image for left eye to be observed to the right eye or the left eye of the observer using the image of the half surface or the negative-positive reversed image thereof as an illumination for the spatial modulation device 10 from the back thereof.

26 Claims, 10 Drawing Sheets

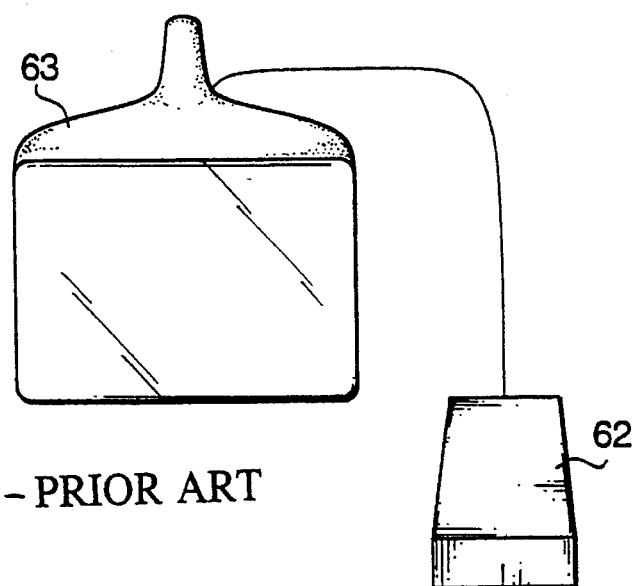
FIG. 1 - PRIOR ART
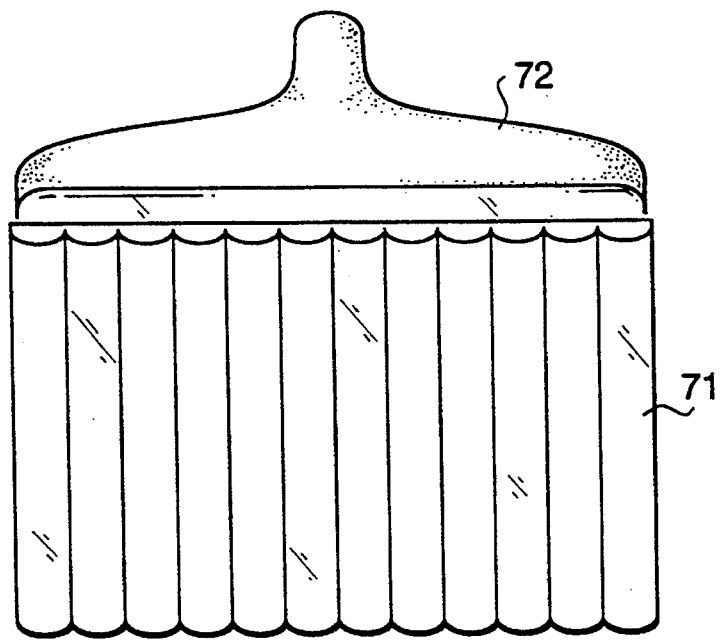
FIG. 2 - PRIOR ART

DIRECT IMAGE

NEGATIVE − POSITIVE
REVERSED IMAGE

DIRECT IMAGE
(TURNED UPSIDE DOWN)

NEGATIVE – POSITIVE
REVERSED IMAGE
(TURNED UPSIDE DOWN)

IMAGE FOR RIGHT EYE TO LCD 10
( AT TIME t )

IMAGE FOR LEFT EYE TO LCD 10
( AT TIME t' )

IMAGE DISPLAY APPARATUS

BACKGROUND OF THE INVENTION

The present invention relates to a display system for displaying an image, and more particularly to a display system for displaying a stereoscopic image for industrial, medical, or domestic use.

In a conventional stereoscopic display system, an observer wears glasses for separating right and left images from each other whereby right and left eyes of the observer can selectively see right and left target images, respectively, which are displayed on an image screen in a time-division fashion. In another conventional technique, a lenticular plate is attached to an image screen so that the lenticular plate can separate right and left images from each other and thus right and left eyes of the observer can selectively see right and left target images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays stereoscopic images wherein images for right and left eyes are displayed alternately in a time-division fashion. Under the control of the synchronous circuit 62, the liquid crystal shutter 61a of the glasses 60 is opened and thus become transparent only when stereoscopic images for the right eye are displayed, and the liquid crystal shutter 61b is opened and become transparent only when stereoscopic images for the left eye are displayed. As a result, an observer wearing the glasses 60 can observe stereoscopic images for the right eye with his or her right eye, and stereoscopic images for the left eye with the left eye. In this way, stereoscopic vision is provided.

FIG. 2 illustrates the configuration of the second example of a conventional stereoscopic-image display system, which includes a lenticular plate 71 having a large number of stripe-shaped cylindrical lenses and a color CRT 72 serving as an image display device.

This second example of stereoscopic-image display system having such a configuration operates as follows. The color CRT 72 displays simultaneously both stereoscopic images for right and left eyes such that images for right and left eyes are displayed alternately on each half-width stripe of the lenticular plate 71. The right eye of an observer sees only the stereoscopic images for the right eye displayed on the above-described slit-shaped zones through corresponding cylindrical lenses of the lenticular plate 71, and the left eye sees only the stereoscopic images for the left eye displayed on the slit-shaped zones, whereby stereoscopic vision is obtained.

In the first example of the conventional stereoscopic-image display system, however, an observer has to wear troublesome and uncomfortable glasses which separately provide stereoscopic images to right and left eyes of the observer. Another problem in observing stereoscopic images using this technique is flicker due to the switching between the stereoscopic images for right and left eyes.

In the second example of the conventional stereoscopic-image display system, since a stereoscopic image is observed via stripe-shaped lenses, stereoscopic vision can be obtained only when an observer is in a limited narrow area. If the observer moves, degradation occurs in the image. Besides, only a few observers at various positions can observe an image at the same time. Furthermore, image processing is required to provide a stripe-shaped image, which needs an expensive apparatus.

In medical applications, when an endoscopic operation is done, an operator observes a plane image of the inside of a patient's abdominal cavity displayed on a monitor via an endoscope. However, the monitored image of the inside of the abdominal cavity has no characteristic features because the entire abdominal cavity has a single color, and thus it is difficult to give perspective vision. This causes a long operation time, and gives heavy loads to both operator and patient. On the other hand, when a conventional stereoscopic-image display system of the above-described first or second type is used in the operation, there are serious problems in practical use such as uncomfortable glasses for separating right and left images, flicker of an image, and limitation in movement of an observer.

SUMMARY OF THE INVENTION

An object of the present invention is to provide an image display apparatus which can overcome the aforementioned problems of the prior art.

Another object of the present invention is to provide an image display apparatus which does not require eyeglasses having a dividing function and which enables many observers to observe an image with their right eyes and an image different from that image with their left eyes at the same time regardless of the observer's position.

To achieve the above-described objects, the present invention provides an image display apparatus for allowing an observer to observe an image with his or her right eye and an image different from that image with his or her left eye, which comprises:

a spatial modulation device having light transmission characteristics;

an imaging device for obtaining an image of a surface of the observer;

a display device for displaying the image of the observer obtained by the imaging device to illuminate the spatial modulation device from behind; and an optical device for giving directivity to a light from the display device.

The display device displays the image of the surface of the observer obtained by the imaging device and an image obtained by negative-positive reversing the image of the surface as figures for illuminating the spatial modulation device.

The image of the surface of the observer, displayed by the display device, acts as a back light source for one of the observer's eyes, and the negative-positive reversed image serves as a back light source for the other eye.

In a preferred form of the present invention, the display device is placed outside of a focal length of the optical device.

In another preferred form of the present invention, the optical device is placed between the spatial modulation device and the display device.

In another preferred form of the present invention, the spatial modulation device comprises a liquid crystal display device.

In another preferred form of the present invention, the spatial modulation device comprises a light transparent type film.

In another preferred form of the present invention, the optical device comprises a convex lens, a Fresnel lens or a concave mirror.

In another preferred form of the present invention, the imaging device images either a left half surface of a face of the observer or a right half surface thereof.

In another preferred form of the present invention, the image display apparatus further comprises an illumination for illuminating a surface of a right or left side of a physical body of the observer.

In another preferred form of the present invention, the image display apparatus further comprises a device for obtaining the negative-positive reversed image by complementing the direct image of the physical surface of the observer obtained by the imaging device; and a control device for displaying the direct image and the negative-positive reversed image on the display device on a time-division basis. The time-division display of the direct image and the negative-positive reversed image enables the size of the system to be reduced.

In another preferred form of the present invention, the illumination radiates infrared radiation, and the imaging device can perform selective imaging on infrared wavelengths of the illumination.

In another preferred form of the present invention, the imaging device has a wavelength filter capable of selectively transmitting the infrared wavelengths.

Still another object of the present invention is to provide an image display apparatus which offers a screen having no flicker.

To achieve that object, the present invention provides an image display apparatus for allowing an observer to observe an image with his or her right eye and an image different from the image with his or her left eye, which comprises:

a pair of spatial modulation devices having light transmission characteristics;

an imaging device for obtaining an image of a surface of the observer;

a pair of display devices for displaying the image of the observer obtained by the imaging device to illuminate the pair of spatial modulation devices from behind, respectively;

a synthesizing device for synthesizing images present on the pair of spatial modulation devices as a single image; and a pair of optical devices for giving directivity to back lights of the pair of display devices so that the display devices can serve as back light illuminations of the spatial modulation devices for the right and left eyes, respectively.

The pair of display devices display the image of the surface of the observer obtained by the imaging device and an image obtained by negative-positive reversing the image of the surface as figures for illuminating the spatial modulation devices.

In this way, time-division control is not necessary, and flicker is eliminated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 illustrates an example of a conventional stereoscopic image display apparatus;

FIG. 2 illustrates another example of the conventional stereoscopic image display apparatus;

PREFERRED EMBODIMENTS OF THE INVENTION

Embodiments of a display apparatus for displaying a stereoscopic image according to the present invention will now be described with reference to the accompanying drawings.

<First Embodiment>

Figure 3:
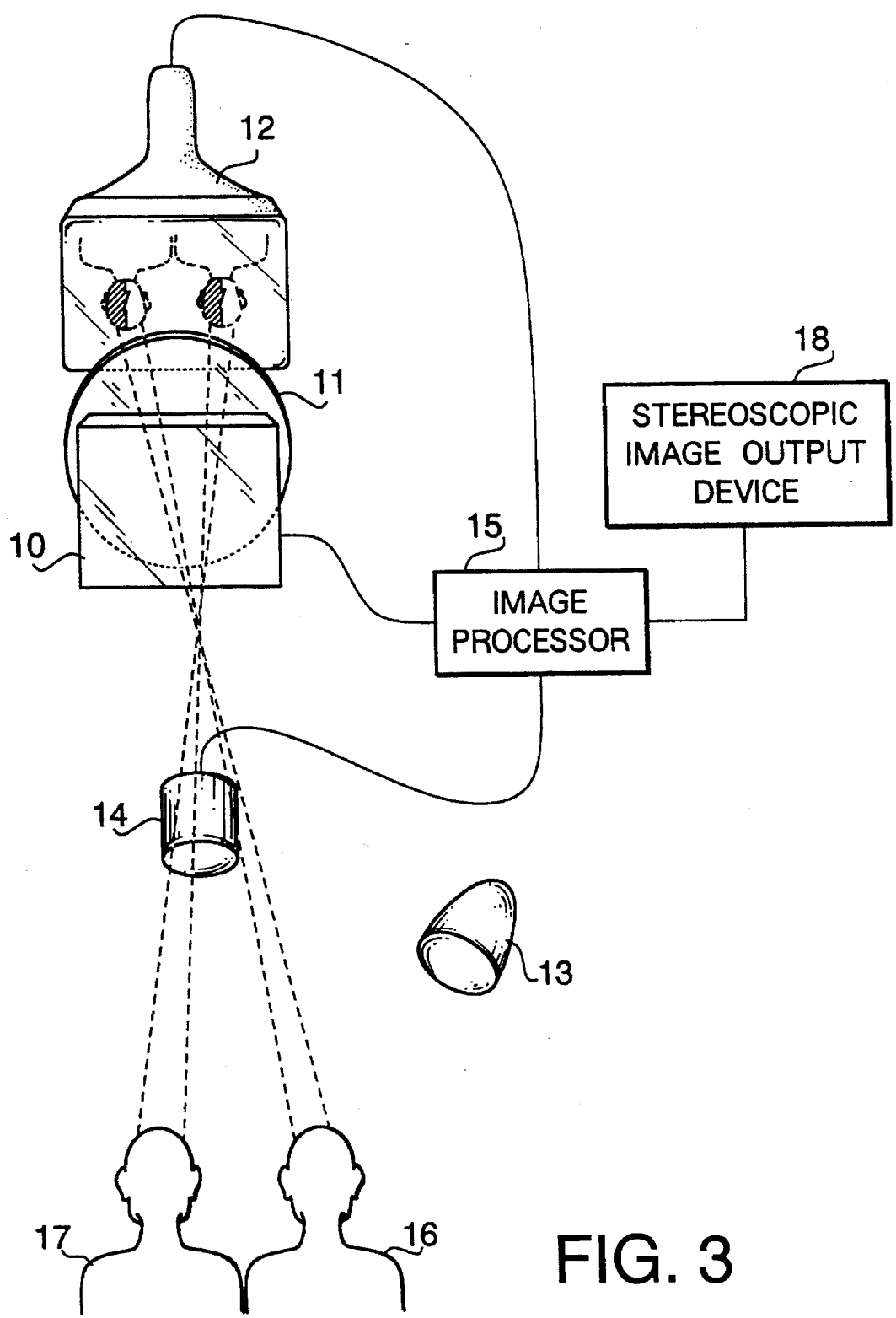
FIG. 3 illustrates a first embodiment of a stereoscopic image display apparatus according to the present invention.

FIG. 3 shows a structure of a stereoscopic image display apparatus according to the first embodiment of the present invention.

Referring to FIG. 3, reference numeral 10 denotes a light transmission type liquid crystal display functioning as a spatial modulation device. Reference numeral 11 denotes a Fresnel lens which is an optical device located on a rear side of the spatial modulation device and having a focal length of 150 mm. Reference numeral 12 denotes a black and white CRT functioning as an observer image display device having a light radiation function. The black and white CRT is located on a side of the lens 11 which is opposite to that on which the spatial modulation device 10 is disposed at a position separated from the lens 11 by 160 mm. The focal length of the lens 11 is shorter than 160 mm. Reference numeral 13 denotes an LED light serving as an illumination device of a wavelength of about 850 nm. Reference numeral 14 denotes a black and white CCD camera functioning as an imaging device. Reference numeral 15 denotes an image processor for generating a negative-positive reversed image of the image obtained by the black and white CCD camera 14 therefrom and for alternately displaying the image obtained by the camera and the negative-positive reversed image thereof on the black and white CRT on a time-division basis. Reference numerals 16 and 17 respectively denote observers who observe a stereoscopic image. Since the camera 14 photographs faces of the observers 16 and 17, the image processed by the image processor 15 is the image of the observers' faces.

Figure 4:
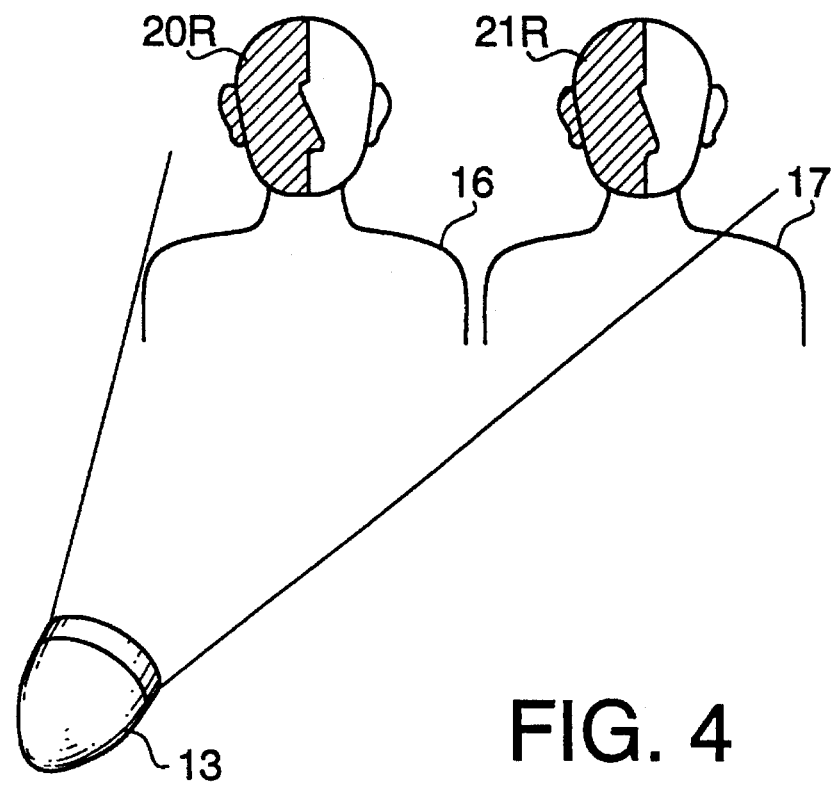
FIG. 4 illustrates the principle of producing back light images employed in a plurality of embodiments of the present invention.

FIG. 4 illustrates how the observers are illuminated by the LED 13 from the right side thereof. In FIG. 4, reference numerals 20R and 20L respectively denote areas of the observers 16 and 17 which are illuminated by the LED 13. The CCD camera 14 is located such that it can photograph the faces of the thus-illuminated observers.

Figure 5:
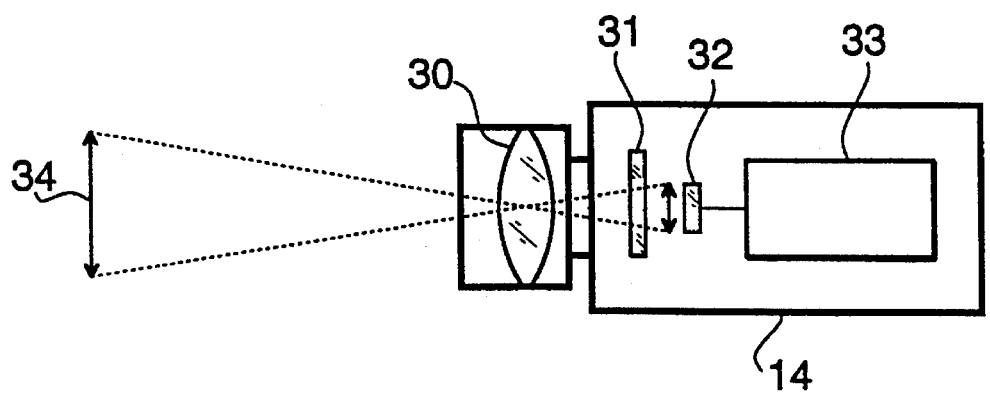
FIG. 5 is a cross-sectional view of a camera employed in the plurality of embodiments of the present invention as an imaging device.

FIG. 5 is a cross-sectional view of the black and white CCD camera 14. Reference numeral 30 denotes an imaging lens. Reference numeral 31 denotes an interference filter serving as a wavelength filter. Reference numeral 32 denotes an imaging device having a CCD chip. Reference numeral 33 denotes a driving circuit for the imaging device. Reference numeral 34 denotes an object (which is observers faces in the example shown in FIG. 4).

The operation of the thus-arranged stereoscopic image display apparatus will now be described with reference to FIGS. 3 through 5.

The observers 16 and 17 observes a stereoscopic image in the manner described below: An objective image for right eye and an objective image for left eye are generated and sent to the image processor 15 by a stereoscopic image output device 18 to obtain a stereoscopic image. The stereoscopic image output device 18 may be a video tape recorder, a laser disk player or a pair of TV cameras. The image processor 15 displays the objective image for right eye and the objective image for left eye alternately on the liquid crystal display 10 on a time-division basis.

A desirable time division rate is alternate display of 10 to 25 frames per second. If the time division rate is less than 10 frames per second, the image flickers and becomes inadequate for observation. If the time division rate is more than 25 frames per second, the liquid crystal display 10 may not respond to the speed, generating a so-called crosstalk of images in which the left (right) eye recognizes the image for right (left) eye.

The LED 13 disposed at the right front side of the observers 16 and 17 illuminates the areas 20R and 21R which are the right half sides of the faces of the observers 16 and 17, as shown in FIG. 4. The LED 13 radiates infrared radiation having a wavelength of about 850 nm, as mentioned above. As shown in FIG. 5, the black and white CCD camera 14 has, between the imaging device 32 and the imaging lens 30, the interference filter 31 which transmits light having a wavelength of 850±20 nm. In other words, when an image of the object 34 is to be formed on the imaging device 32, only the portion of the object 34 which has been illuminated by the infrared radiation of 850±20 nm reaches the imaging device 32. Accordingly, in the system shown in FIG. 3 which employs the camera having the structure shown in FIG. 5, the CCD camera 14 produces only the images of the areas 20R and 21R on the observers' faces. Consequently, the image processor 15 produces the images of the right sides of the observers' faces.

The image processor 15 performs negative-positive reversal on the produced images of the right sides of the observers' faces. If the resolution of the CCD 32 of the camera 14 is, for example, 8 bits, the density of the image signal output from the CCD 32 ranges from 0 to 255. Negative-positive reversal process conducted by the image processor 15 is to complement the density value with respect to the image signal sent from the camera 14. If the density value is, for example, "30", the complement thereon is "225".

Figure 6:
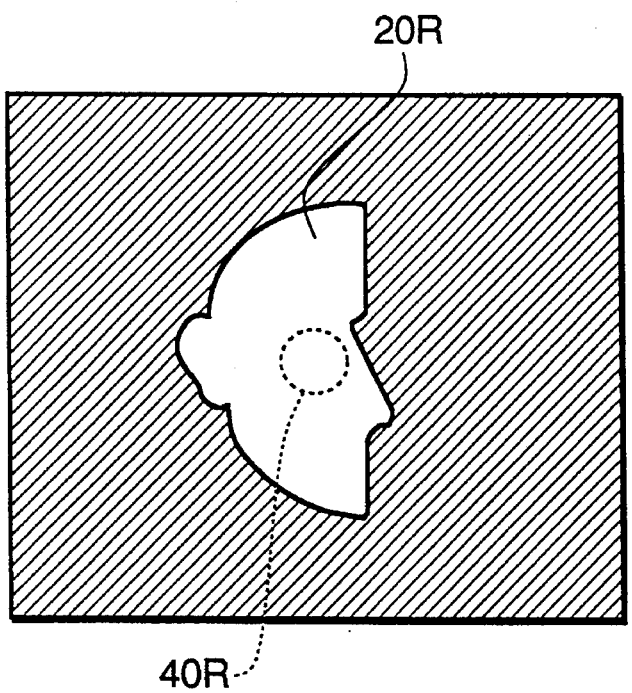
FIG. 6 illustrates a process of producing a back light image.
Figure 7:
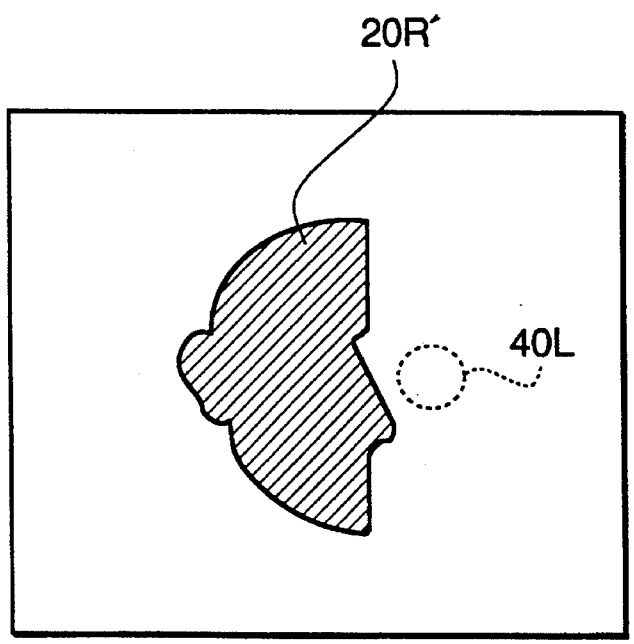
FIG. 7 illustrates a process of producing a back light image.

FIG. 6 illustrates the image of the brightly illuminated portion 20R of the observer's 16 face photographed by the camera 14 (the image obtained directly from the camera is called a direct image for convenience of the description). No image of the observer 17 is drawn in FIGS. 6 and 7 to simplify the illustration. In FIG. 6, a hatched portion represents a dark area (having a high density) where an illumination light of the light 13 does not reach. FIG. 7 indicates a negative-positive reversed image obtained by negative-positive reversing the direct image. In FIG. 7, a hatched portion 20R' represents a dark area (having a high density) obtained by reversing the bright area 20R.

In FIG. 6, an area 40R is part of the bright area 20R in the direct image. In FIG. 7, an area 40L is part of the bright area of the reversed image. As will be described later, the area 40R serves as a back light for the right eye of the observer 16, and the area 40L acts as a back light for the left eye of the observer 16. The image processor 15 displays the areas 40R and 40L on the CRT display 12 on a time-division basis. The spatial modulation device, which may be a liquid crystal display device or a film having light transmission characteristics, radiates no light by itself, and therefore has a light source which illuminates the spatial modulation device from behind. In this specification, the light source which supplies light to the spatial modulation device from behind is called "a back light source". In this invention, the image displayed on the display device, such as a CRT, is used as the back light source. The displayed image is thus called "a back light source image".

The image produced by the camera 14 is multivalued. In this system, since the CRT 12 is utilized as the back light source, display of a binary back light source image on the CRT 12 is desired. Therefore, the image processor 15 compares each of the pixels of the back light image with a predetermined threshold, and gives "1" to the pixel having a density higher than the threshold not to make the corresponding phosphor on the CRT give forth light and gives "0" to the pixel having a density lower than the threshold to make the corresponding phosphor on the CRT give forth light.

The image processor 15 synchronizes display of the image for right eye and the image for left eye on the liquid crystal display 10 on a time-division basis with display of the areas 40R and 40L on the CRT display 12 on a time-division basis. This will be described in detail later.

Figure 8:
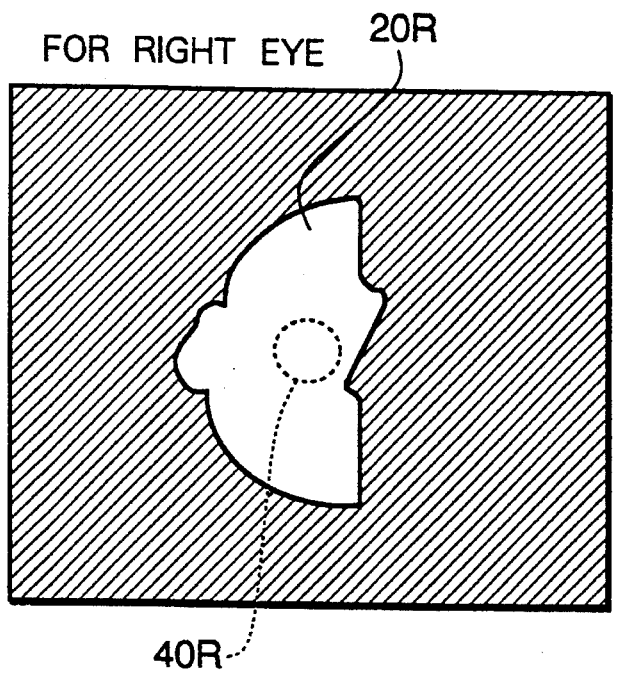
FIG. 8 illustrates a process of producing a back light image for right eye.
Figure 9A:
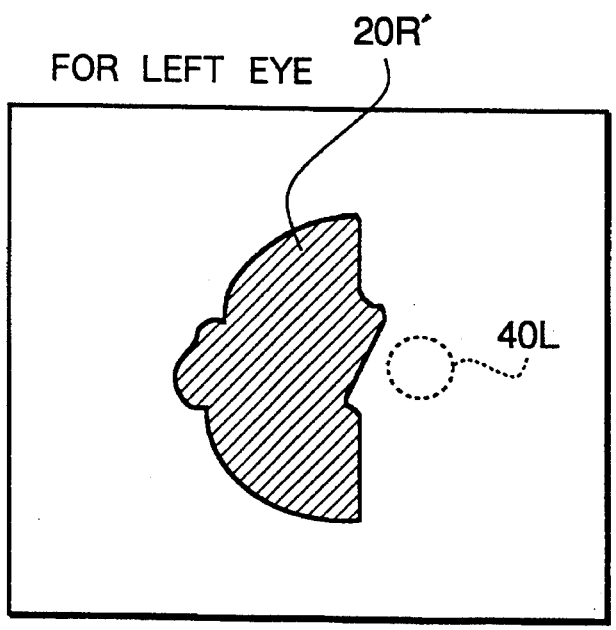
FIG. 9A illustrates a process of producing a back light image from the image in FIG. 8, for left eye.

The observers who see the images which are being displayed on the modulation device 10 may move in the vertical direction. They may stand up or sit down. Therefore, the image processor 15 is designed to move the back-lighting images displayed on the CRT 12 in the vertical direction in accordance with the movement of the observers. To achieve this, the images of the observers' faces, serving as the back light sources, are inverted in the vertical direction. FIGS. 8 and 9A respectively illustrate inverted images (turned up side down) of the images of the observers' right faces shown in FIGS. 6 and 7. That is, the bright area 40R shown in FIG. 8 is used as the back light source for the right eye of the observer 16, and the bright area 40L shown in FIG. 9A is used as the back light source for the left eye of the observer 16.

Figure 9B:
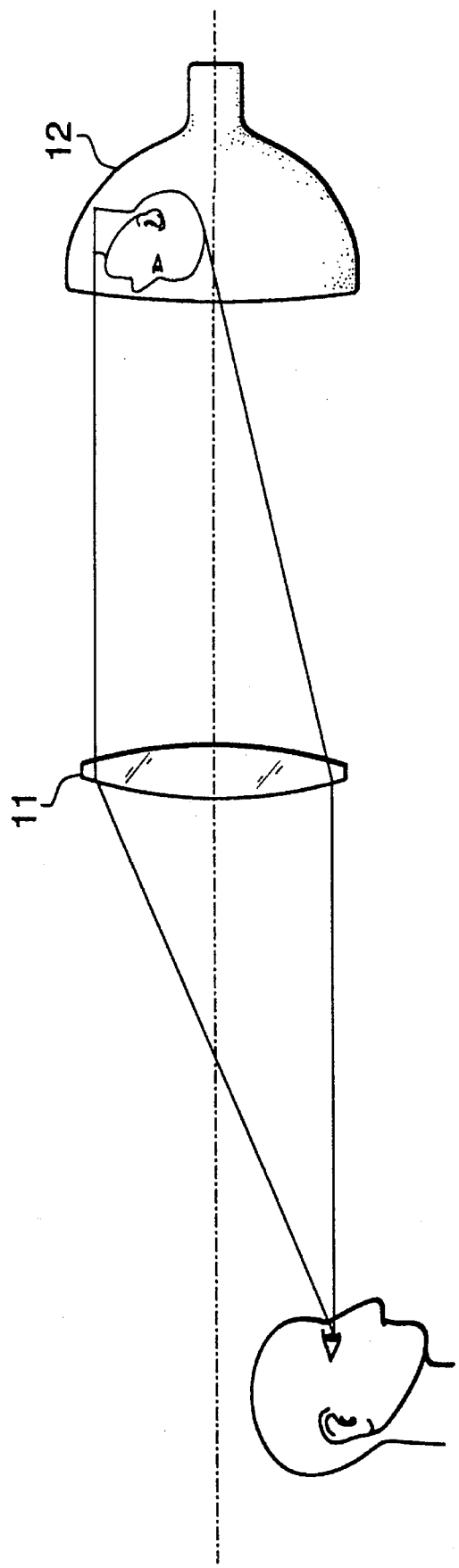
FIG. 9B illustrates a reason why the image for left eye is inverted.

FIG. 9B further explains why the inversion of the back-lighting images is necessary. If the observer sits down, the back-lighting image of the observer would go downward, which would result in that the image on the CRT 12 would not function as back-lighting image. In other words, when the observer sits down the back-lighting image should be moved upwardly in the CRT display, while when he or she stands up the image should be moved downward. See FIG. 9B. The image processor 15 achieves the movement of the back lighting image by inverting image data in the vertical direction with respect to the display space of the CRT 12. The inversion in the vertical direction functions to move an image at a lower (or higher) position to a higher (or lower) position within the display area of the CRT 12.

Inverting image data in the vertical direction may be performed simply by rotating to place the CRT display 12 up side down.

Figure 10:
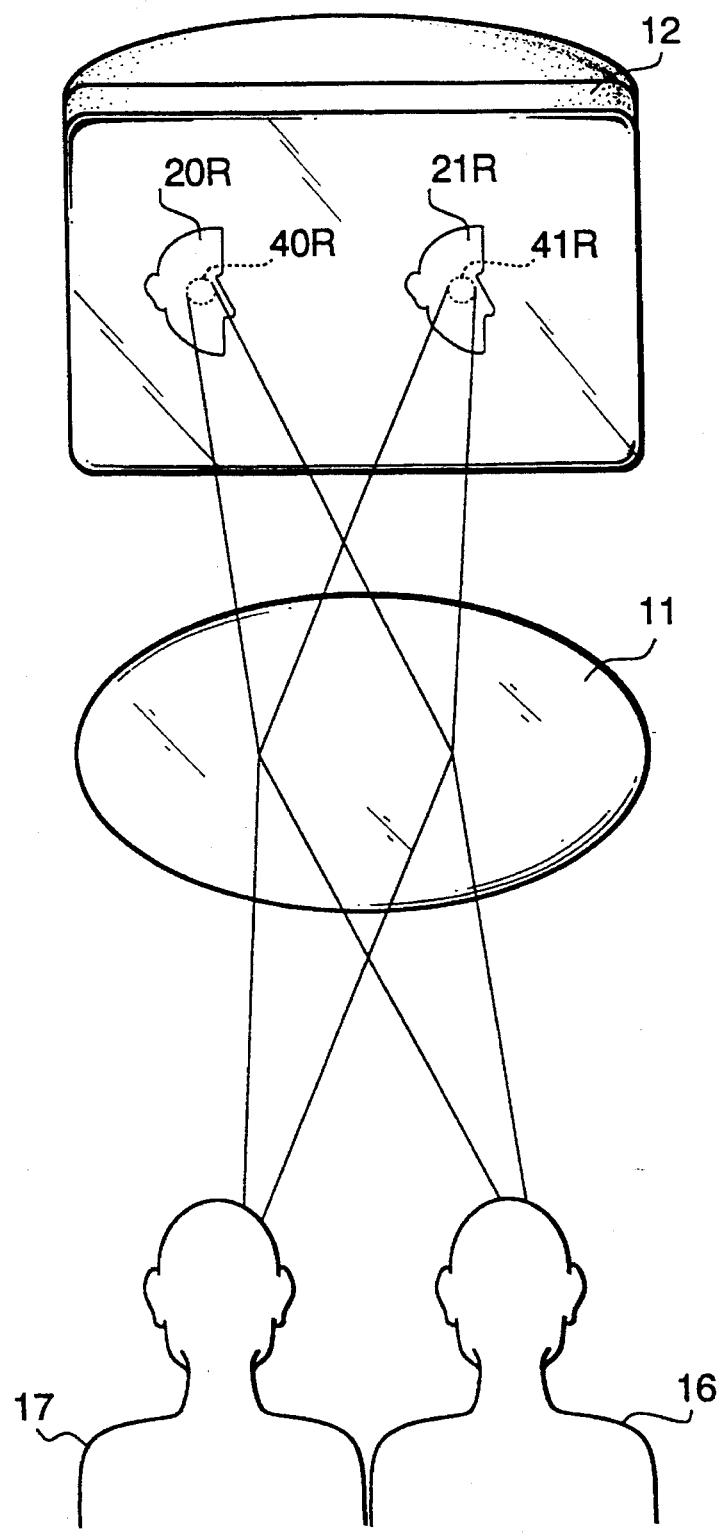
FIG. 10 illustrates how the back light image illuminates the right eye in the time-division control of the display apparatus according to the first embodiment.
Figure 11:
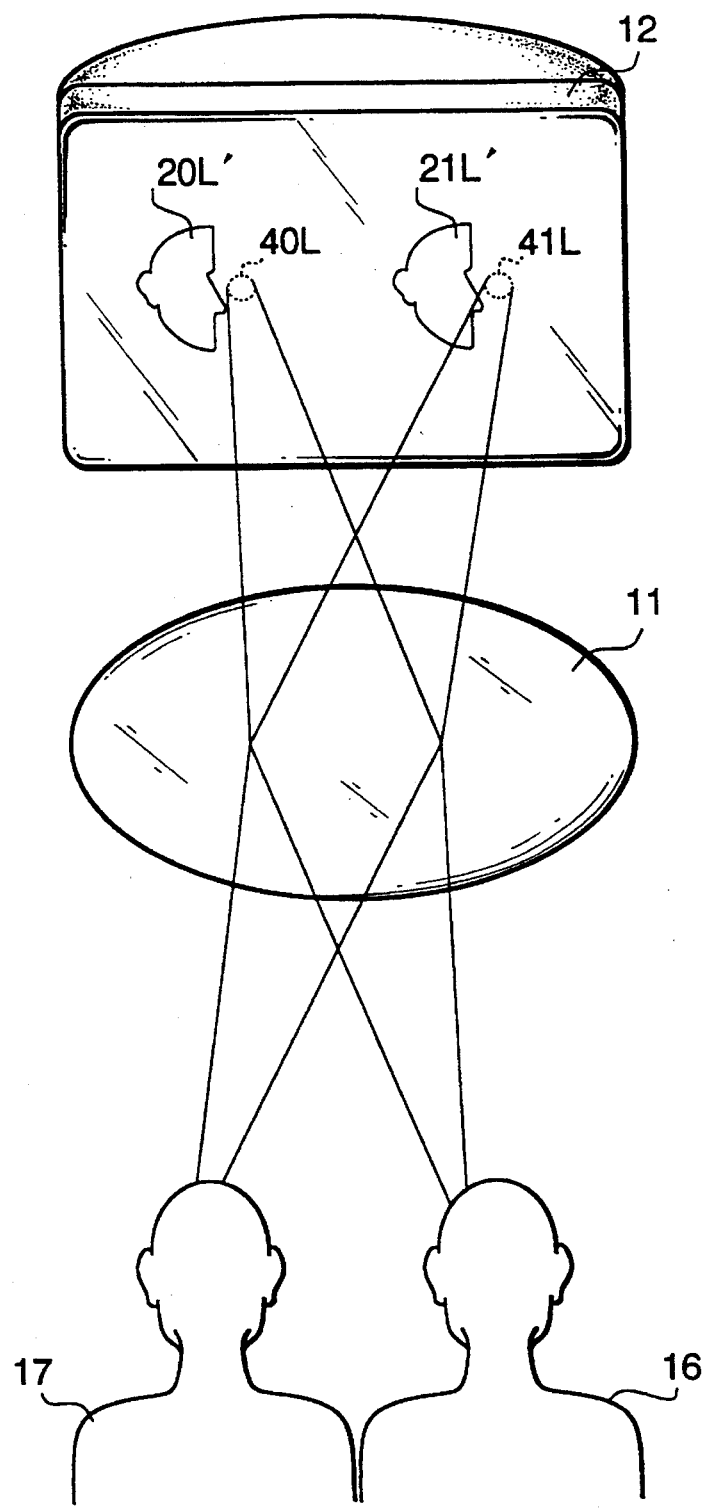
FIG. 11 illustrates how the back light image illuminates the left eye in the time-division control of the display apparatus according to the first embodiment.

FIGS. 10 and 11 illustrate the optical paths from the back light sources when the back light source areas are observed by the two observers on a time-division basis. When the image for right eye is displayed on the liquid crystal display 10, as shown in FIG. 10, the light from the back light source area 40R passes through the Fresnel lens 11 and reaches the right eye of the observer 16, while the light from the back light source area 41R reaches the right eye of the observer 17 (located on the left side of the observer 16) through the Fresnel lens 11. Assuming that a time when the image for right eye is offered to the observers is t, when the image for left eye is displayed on the liquid crystal display 10 at a time t' which is $\Delta\tau$ later from the time t, the light from the back light source area 40L illuminates the left eye of the observer 16 through the Fresnel lens 11, while the light from the back light source area 41L irradiates the left eye of the observer 17 through the Fresnel lens 11, as shown in FIG. 11.

When the negative-positive reversed image is used as the back light source, the bright area spreads over the area 40L, as shown in FIG. 9A. However, since the back light source does not act on the opposite eye at that time (because the dark area 20R' corresponds to the right eye in the example shown in FIG. 9A), crosstalk does not occur.

The luminance and contrast of the black and white CRT 12, the stop of the CCD camera 14 and so on are adjusted so that the face area can be displayed white at high luminance.

The operation of the Fresnel lens 11 will be described below. When the Fresnel lens 11, which enables the observers 16 and 17 to observe their images displayed upside down on the black and white CRT 12 as virtual images, is provided at a position which allows the black and white CRT 12 to be present beyond the focal length of the Fresnel lens 11, it can allow only the areas on the black and white CRT 12, corresponding to the right and left sides of the observers' faces, to be independently and respectively observed by the observers with their right and left eyes in an enlarged fashion limited by the effective diameter of the Fresnel lens 11 to the observers' right and left eyes. Thus, when the images of the right sides of the observers' faces are displayed, the images of the right face sides of the observers 16 and 17 act as illumination having a magnitude corresponding to the effective diameter of the Fresnel lens 11 and having selectivity to the right eye. At that time, since the portions of the CRT display 12 corresponding to the left sides of the observers' faces do not radiate, no light from the black and white CRT 12 enters the left eye. Similarly, when the negative-positive inverted images of the right sides of the faces are displayed, since the portion of the CRT 12 which does not radiate light when the images of the right sides of the faces are displayed radiates light, that portion acts as illumination having a magnitude corresponding to the effective diameter of the Fresnel lens 11 and having selectivity to the left eye. At that time, since the portion of the CRT display 12 corresponding to the right sides of the observers' faces does not radiate light, no light from the black and white CRT 12 enters the right eye.

In the above-described operation of the system shown in FIG. 3, the objective image for right eye displayed on the liquid crystal display 10 is illuminated from behind and is made observable only to the right eyes of the observers 16 and 17, while the objective image for left eye displayed on the liquid crystal display 10 is illuminated from behind and is made observable only to the left eyes of the observers 16 and 17. Accordingly, the above-described operation enables the observers 16 and 17 to observe the pair of stereoscopic images, enabling them to have a stereoscopic vision. Even if the observers 16 and 17 shift their positions, as long as the illumination conditions by the LED, shown in FIG. 2, are maintained, stereoscopic vision is obtained.

In the above-described embodiment, the transparent liquid crystal display is used as the spatial modulation device. However, any spatial modulation device having light transparent characteristics and capable of displaying stereoscopic images, for example, a film on which images are recorded, can be employed. Further, the LED employed as the light can be replaced by any light as long as that light can radiate infrared radiation. For example, a halogen lamp with a wavelength filter mounted thereon to limit the radiation bandwidth may be used.

A convex lens or a concave mirror may also be used in place of the Fresnel lens.

The above description has focused on the case in which the imaging device takes a picture of the right sides of the observers' faces. However, the same effect can be obtained even when the imaging device takes a picture of the left sides of the observers' faces and other conditions are changed accordingly.

<Second Embodiment>

Figure 12:
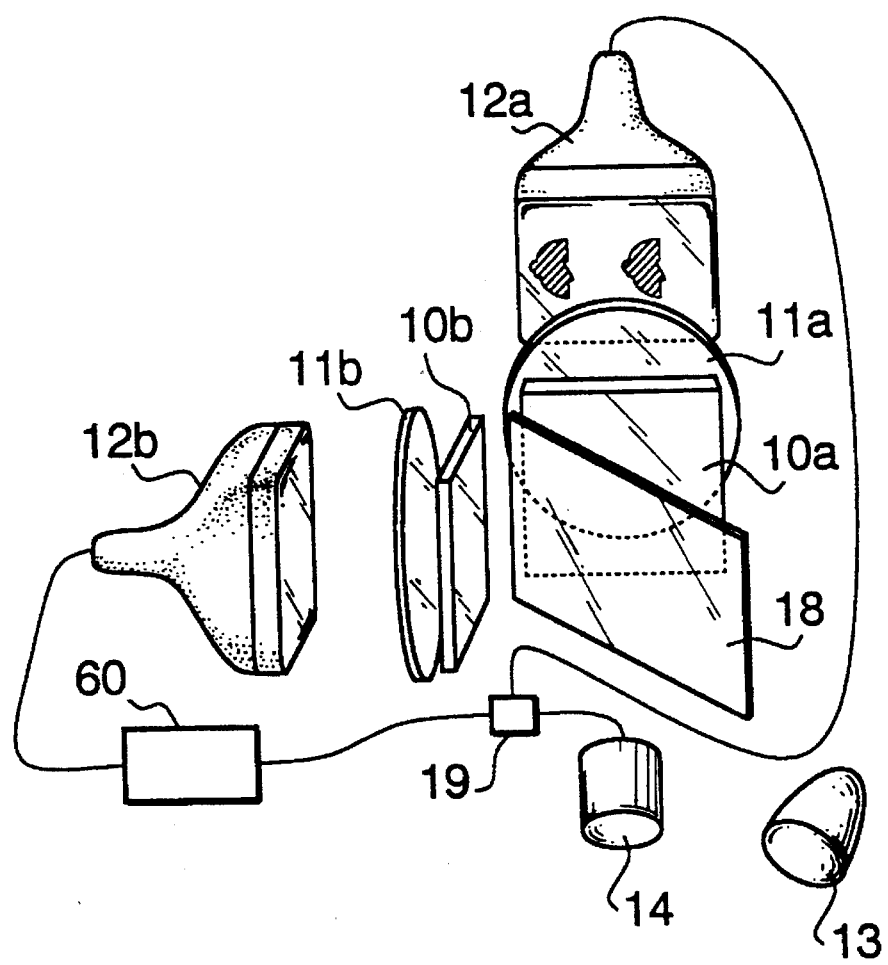
FIG. 12 illustrates a second embodiment of the stereoscopic image display apparatus according to the present invention.

FIG. 12 illustrates the structure of the stereoscopic image display apparatus according to the second embodiment of the present invention. Reference numerals 10a and 10b denote transparent liquid crystal displays serving as the spatial modulation devices. Reference numerals 11a and 11b denote Fresnel lenses which are respectively located at the rear sides of the spatial modulation devices 10a and 10b and which have a focal length of 150 mm. Reference numerals 12a and 12b denote black and white CRTs functioning observer image display apparatuses having a radiation function. The black and white CRTs 12a and 12b are located at positions separated from the lenses 11a and 11b by a distance of 160 mm on the sides of the lenses 11a and 11b which are opposite to those on which the spatial modulation devices 10a and 10b are located, respectively. Reference numeral 13 denotes an LED light having a wavelength of 850 nm and serving as an illumination device. Reference numeral 14 denotes a black and white CCD camera serving as an imaging device. Reference numeral 18 denotes a half mirror for synthesizing the images displayed on the spatial modulation devices 10a and 10b as a single image. Reference numerals 16 and 17 denote observers who observe a stereoscopic image. Reference numeral 19 denotes a signal distributor. Reference numeral 60 denotes a negative-positive reversing circuit.

The above-described first embodiment is designed such that the objective image for right eye and the objective image for left eye are displayed on the single liquid crystal display serving as the spatial modulation device on a time-division basis and such that the back light source image for right eye and the back light source image for left eye are displayed on the CRT 12 on a time-division basis synchronously with the display of the objective images. Although time-division control is advantageous in terms of the cost, it makes the images flicker because of the switch over of the images. The second embodiment employs the pair of liquid crystal displays 10a and 10b and the pair of CRTs 12a and 12b in place of time-division control.

The thus-arranged operation of the stereoscopic image display apparatus is basically the same as that of the first embodiment according to the present invention shown in FIG. 3. Identical reference numerals in FIG. 12 to those in FIG. 3 represent identical or similar elements, description being omitted. The signal distributor 19 receives the video signals of the images of the right sides of the observers' 16 and 17 faces obtained by the camera 14, and distributes the received images to the black and white CRTs 12a and 12b. The black and white CRT 12a displays the images (of the right sides of the observers' faces) upside down, and the black and white CRT 12b displays upside down mirror images of the images of the right sides of the observers faces which are obtained by the negative-positive reversing circuit 60. The reason why the images displayed on the CRT 12b are mirror images is that the images observed by the observers are those reflected by the half mirror 18. The objective image for left eye displayed on the liquid crystal display 10b is also a mirror image.

In the above-described operation of the display apparatus according to the present invention, the objective image for right eye displayed on the liquid crystal display 10a shown in FIG. 12 is illuminated from behind and is made observable to the right eyes of the observers 16 and 17, and the objective image for left eye displayed on the liquid crystal display 10b is illuminated from behind and is made observable to the left eyes of the observers. The objective images for right and left eyes are combined by the half mirror 18 so that they can be consecutively observed by the observers. Thus, the observers 16 and 17 are capable of observing the pair of objective images at the same time three-dimensionally, and no flicker which would occur in the time-division display of the first embodiment does not occur. Further, even if the observers 16 and 17 shift their positions, as long as the illumination conditions by the LED, shown in FIG. 2, are maintained, three-dimensional observation is possible.

The above description has focused on the case in which the imaging device takes a picture of the right sides of the observers' faces. However, the same effect can be obtained even when the imaging device takes a picture of the left sides of the observers' faces and other conditions are changed accordingly.

<Third Embodiment>

Figure 13:
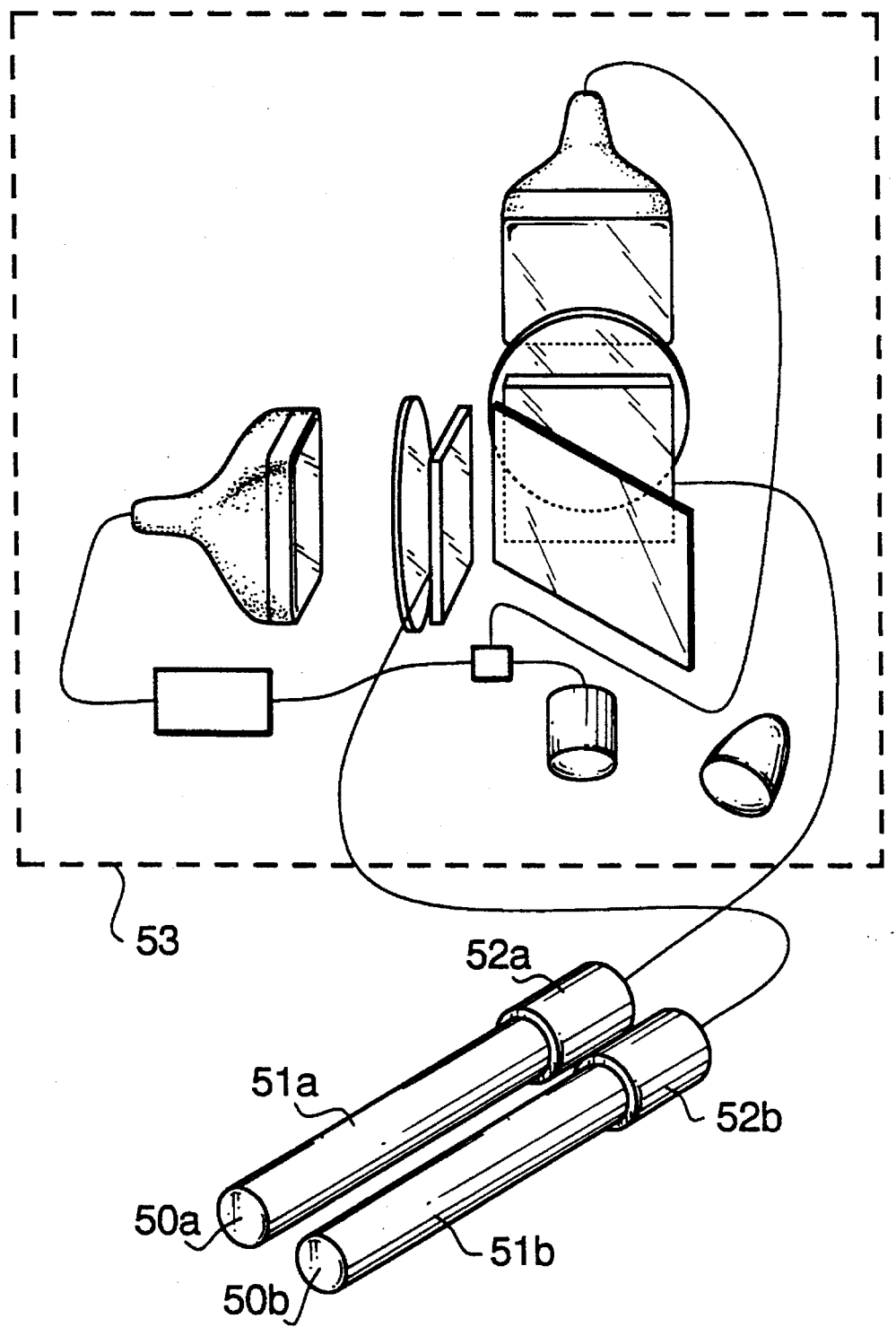
FIG. 13 illustrates an application of the stereoscopic image display apparatus according to a third embodiment.

FIG. 13 illustrates a third embodiment according to the present invention in which the stereoscopic image display apparatus is applied to an endoscope. Reference numerals 50a and 50b denote objective lenses used to photograph the object. Reference numerals 51a and 51b denote lens mirrors for accommodating optical systems for introducing the photographed images. The lens mirrors 51a and 51b are provided such that they have an angle corresponding to the convergence angle of the observers' eyes. Reference numerals 52a and 52b denote CCD cameras. Reference numeral 53 denotes a stereoscopic image display apparatus which has been described with reference to FIG. 12 as the second embodiment according to the present invention.

The operation of the thus-arranged endoscope apparatus will now be described. The two images of the object obtained through the objective lenses 50a and 50b are respectively formed on the CCD cameras 52a and 52b as the image for right eye and the image for left eye by the lens barrels 51a and 51b provided such that they have a convergence angle to offer a stereoscopic vision. The two formed images are input to and displayed by the liquid crystal displays 10a and 10b of the stereoscopic image display apparatus 53 as a pair of stereoscopic images. Thus, the stereoscopic image display apparatus enables a large number of observers to stereoscopically observe the images obtained by the stereoscopic endoscope due to the function thereof which has been described in the first embodiment.

In the first to third embodiments, the monochromatic light source and the monochromatic camera are employed to obtain images. However, a color light source and a color camera may also be employed.

As will be described below, in the stereoscopic image display apparatus which employs a pair of stereoscopic images, no eye glasses having a dividing function is required, and a large number of observers can stereoscopically observe the image at the same time and under the same conditions even when they shift their positions. Further, since a negative-positive reversed image is used, only a single imaging device is required, making the present invention contribute to practical use and expansion of application of the stereoscopic image display apparatus.

Further, the stereoscopic endoscope apparatus obtained by combining the present invention with an endoscope having a pair of imaging devices for obtaining the image of an object to be stereoscopically observed from two directions can contribute greatly to operations conducted under endoscopic observation.

Further, the display system according to the various embodiments described above can give different images to the left and right eyes of observer for recognition. Therefore, the present invention may be applied to various displays such as eye sight measurement apparatus.

The present invention is not limited to the above embodiments and various changes and modifications can be made within the spirit and scope of the present invention. Therefore, to appraise the public of the scope of the present invention, the following claims are made.

What is claimed is:

1. An image display apparatus for allowing an observer to observe an image with his or her right eye and an image different from said image with his or her left eye, said apparatus comprising:

a spatial modulation device having light transmission characteristics;

an imaging device for obtaining an image of a surface of the observer;

a display device for displaying the image of the observer obtained by said imaging device to illuminate said spatial modulation device from behind; and an optical device for giving directivity to a light from said display device, wherein said display device displays the image of the surface of the observer obtained by said imaging device and an image obtained by negative-positive reversing said image of the surface of the observer as figures for illuminating said spatial modulation device.

2. An image display apparatus according to claim 1, wherein said display device is placed outside of a focal length of said optical device.

3. An image display apparatus according to claim 2, wherein said optical device is placed between said spatial modulation device and said display device.

4. An image display apparatus according to claim 1, wherein said spatial modulation device comprises a liquid crystal display device.

5. An image display apparatus according to claim 1, wherein said spatial modulation device comprises a light transparent type film.

6. An image display apparatus according to claim 1, wherein said optical device comprises a convex lens, a Fresnel lens or a concave mirror.

7. An image display apparatus according to claim 1, wherein said imaging device images either a left half surface of a face of the observer or a right half surface thereof.

8. An image display apparatus according to claim 1, further comprising: an illumination for illuminating a surface of a right or left side of a physical body of the observer.

9. An image display apparatus according to claim 8, wherein said illumination radiates infrared radiation, and wherein said imaging device can perform selective imaging on infrared wavelengths of said illumination.

10. An image display apparatus according to claim 9, wherein said imaging device has a wavelength filter capable of selectively transmitting the infrared wavelengths.

11. An image display apparatus according to claim 1, further comprising: means for obtaining the negative-positive reversed image by complementing the direct image of the physical surface of the observer obtained by said imaging device; and control means for displaying said direct image and said negative-positive reversed image on said display device on a time-division basis.

12. An image display apparatus according to claim 11, further comprising means for turning said direct image and said negative-positive reversed image in up side down direction.

13. An image display apparatus for allowing an observer to observe an image with his or her right eye and an image different from said image with his or her left eye, said apparatus comprising:

a pair of spatial modulation devices having light transmission characteristics;

an imaging device for obtaining an image of a surface of the observer;

a pair of display devices for displaying the image of the observer obtained by said imaging device to illuminate said pair of spatial modulation devices from behind, respectively;

synthesizing means for synthesizing images present on said pair of spatial modulation devices as a single image; and a pair of optical devices for giving directivity to back lights of said pair of display devices so that said display devices can serve as back light illuminations of said spatial modulation devices for the right and left eyes, respectively, wherein said pair of display devices display the image of the surface of the observer obtained by said imaging device and an image obtained by negative-positive reversing said image of the surface as figures for illuminating said spatial modulation devices.

14. An image display apparatus according to claim 13, wherein said pair of display devices are placed outside of a focal length of said optical device.

15. An image display apparatus according to claim 14, wherein said pair of optical devices are respectively placed between said pair of spatial modulation devices and said pair of display devices.

16. An image display apparatus according to claim 13, wherein said pair of spatial modulation devices comprise liquid crystal display devices.

17. An image display apparatus according to claim 13, wherein said pair of spatial modulation devices comprise a pair of light transparent type films.

18. An image display apparatus according to claim 13, wherein each of said pair of spatial modulation devices inputs an image signal from an endoscope apparatus, said endoscope apparatus including a pair of lens barrels for sending an image of an object to be stereoscopically observed so as to enable imaging thereof from two directions, and a pair of imaging devices for converting the pair of images of the object into electrical signals.

19. An image display apparatus according to claim 13, wherein said optical device comprises a convex lens, a Fresnel lens or a concave mirror.

20. An image display apparatus according to claim 19, wherein said pair of optical devices comprise Fresnel lenses each provided on a back surface of each of said pair of spatial modulation devices.

21. An image display apparatus according to claim 13, further comprising: illumination for illuminating a surface of a right or left side of a physical body of the observer.

22. An image display apparatus according to claim 21, wherein said illumination radiates infrared radiation, and wherein said imaging device can perform selective imaging on infrared wavelengths of said illumination.

23. An image display apparatus according to claim 22, wherein said imaging device has a wavelength filter capable of selectively transmitting the infrared wavelengths of said imaging device.

24. An image display apparatus according to claim 13, further comprising: means for obtaining a negative-positive reversed image by complementing a direct image of the physical surface of the observer obtained by said imaging device; and control means for displaying said direct image and said negative-positive reversed image on said pair of display devices.

25. An image display apparatus-according to claim 24, further comprising means for turning said direct image and said negative-positive reversed image in up side down direction.

26. An image display apparatus for allowing an observer to observe an image with his or her right eye and an image different from said image with his or her left eye, said apparatus comprising:

an imaging device for image-sensing a surface of the observer;

a device for reversing a density of an image sensed by said imaging device to obtain a density reversed image;

a display device for displaying said sensed image and said density reversed image;

a space modulation device provided in front of said display device to selectively show either of said different images to a space located in front of said display device; and an optical device for giving directivity to a light from said display device so as to allow said display device to serve as a back light illumination of said spatial modulation device for right and left eyes.

* * * * *